Patented July 20, 1954

2,684,378

UNITED STATES PATENT OFFICE 2,684,378

PROCESS FOR FRACTIONATING GLYCERIDIC MIXTURES OBTAINED AS HYDROCARBON SOLUTIONS

Evald Laurids Skau, New Orleans, La., assignor to the United States of America as represented by the Secretary of Agriculture No Drawing. Application February 13, 1951, Serial No. 210,800

3 Claims. (Cl. 260—428.5)

(Granted under Title 35, U. S. Code, (1952), sec. 266)

The invention herein described may be manufactured and used by or for the Government of the United States of America or governmental purposes throughout the world without the payment to me of any royalty thereon.

This application is in part a continuation of my application Serial No. 204,059, filed on January 2, 1951.

This invention relates to processes for isolating fractions of glyceridic mixtures contained in cotton-seed oil by cooling solutions containing the mixtures until a fraction of the glycerides solidify and removing the solids. It provides a method of so fractionating glyceridic mixtures obtained in the form of hydrocarbon solutions without subjecting them to the color- and stability-impairing temperatures required to strip off the hydrocarbon and without encountering the severe tendency to undergo supercooling and to form difficultly removable solids exhibited by hydrocarbon solutions of the glycerides.

It has been well established that to obtain the greatest yields of oil from any natural oil material having a fairly high solids content, the oil should be removed by solvent extraction of the untreated or prepressed oil material. Hydrocarbons comprise the preferred solvents and the American produced extraction hydrocarbons are readily available, free from contaminants, stable enough for indefinite reuse, cheap, and abundant. However, as processes for isolating fractions of glyceridic mixtures have heretofore been conducted it would be necessary to impair the color and stability of the glyceridic mixtures so obtained as hydrocarbon solutions in order to strip off the hydrocarbon and thus avoid the supercooling and solid separation difficulties inherent in fractionating glyceridic mixtures by deposition and removal of solids in hydrocarbon solutions.

The concentration of the hydrocarbon used as an extraction solvent can easily be reduced until the hydrocarbon-oil solution contains only about 10% hydrocarbon by conventional distillation or evaporation processes involving comparatively low temperatures. To strip off or substantially completely remove the hydrocarbon requires the use of much more elaborate apparatus and careful control, and results in the oil being exposed to much higher temperatures for a much longer time than is required to merely reduce the concentration of hydrocarbon to about 10%. It is well known that the exposure of the oil to elevated temperatures has a harmful effect upon the color and the stability of the oil and this effect is cumulative with time of exposure.

I have made the surprising discovery that glyceridic mixtures dissolved in hydrocarbon solvents can be so fractionated without stripping off the hydrocarbon by incorporating in the glyceride-hydrocarbon solution enough oxygen-containing solvent for the mixed glycerides (hereinafter referred to as a polar solvent) to provide a polar solvent-hydrocarbon ratio which for a given oil-solvent ratio constitutes a solution in which the glycerides to be removed solidify into sharply defined solid phases without undesirable supercooling. In addition to avoiding the exposure of the oils to the heat of a stripping-off operation, so modifying the solution provides the unobvious advantage of causing the solidification of a greater fraction of glycerides than that which would solidify at the same temperature if the solvent were an undiluted hydrocarbon, and of avoiding the tendency to form more than one liquid phase along with the solid phases which is often a problem where the solvent is a polar solvent having the solvent characteristics of acetone.

The removal of particular groups of glyceryl esters of fatty acids is of importance in the "winterization" of natural vegetable oils for use in the manufacture of foods such as salad oils and mayonnaise and in the processing of edible and inedible animal, vegetable, and fish oils and fats for a variety of uses. For example, O. M. Behr in a paper in Ind. & Eng. Chem., 28, 299–301 (March 1936) states that the same theory applies to the removal of higher melting mixed saturated and unsaturated triglycerides from drying oils such as sardine, linseed, perilla, hempseed, and the like oils and that "theoretically the presence in an oil of saturated acid radicals would hinder the polymerization of the oil. A varnish plant in the east, which uses a recording thermometer during the kettle-bodying of sardine oils, reported that a thoroughly winterized oil with a 12-hour chill test (F. F. acid, 0.25%) polymerized several hours sooner, to the same degree of polymerization as measured by the viscosity, than winterized varnish-grade oil previously used." On the basis of his own experiments he further states that "It may be concluded, therefore, that highly refrigerated oils will polymerize more rapidly under the same heat input than lightly winterized oils. The presence of glycerides, solid at freezing temperatures are detrimental to polymerization. . . ."

In addition, the removal of particular groups of glycerides by crystallization is important in the alteration of the degree of unsaturation (generally expressed as iodine value) of glyceridic mixtures. Thus, this invention is also applicable to any process for modifying cotton-seed oil or in any process for separating cotton-seed oil into two or more fractions having different iodine values or, in general, different properties, as long as the process involves treating the oil obtained in the form of a hydrocarbon solution by crystallization from a solvent.

Refined cottonseed oil is unsatisfactory for use as salad oil because solids or crystals tend to separate or settle out after a short exposure to refrigerator temperatures. This makes the oil turbid or non-homogeneous. Such an oil is unsuitable for use in salad dressing and, particularly, for use in mayonnaise and dressings of the liquid type, such as French dressing, because of unsatisfactory emulsion stability at ordinary refrigerator temperatures. The tendency of mayonnaise to "break" upon chilling is thought to be caused by the partial crystallization of the oil used.

While cottonseed oil can be winterized (chilled until sufficient glycerides solidify to leave an oil which will not form solids at refrigerator temperatures) it requires slow and careful chilling and since the oil is very viscous at the required temperatures the removal of the crystals is difficult. The winterization of undiluted naturally occurring glyceridic mixtures is tedious, inefficient, and can not feasibly be accomplished in a continuous process.

Obviously various attempts have been made to more efficiently remove enough glycerides to provide winterized cottonseed oil. It is reported that some improvement in the winterization of cottonseed oil is attained by diluting the oil with a hydrocarbon, e. g. hexane. However, it has been found that in hydrocarbon solutions, just as in liquid glyceridic mixtures, the solid glycerides which form behave as though they were in an amorphous state in that their removal is difficult. A systematic study of the use of hexane under typical industrial conditions leads to the following conclusions by the staff of the Southern Regional Research Laboratory: "It is indicated that hexane under the conditions of these experiments would not be a practicable solvent for use in the industrial winterization of cottonseed oil. Too close a control of both the chilling temperature and the oil-solvent ratio would be necessary in order to regulate the amount of solid separating in a 3-hour chilling period. At a given chilling temperature the initial rate of crystallization is very low up to a certain oil-solvent ratio. An increase in the oil concentration beyond this value results in a sharp increase in the amount of solid separating. Also, beyond this sudden break in the curve a small change in the chilling temperature will cause a large change in the percentage of solid separating. A high degree of supersaturation seems to be necessary before the initial rate of separation is appreciable. Thus, the solid yield is very sensitive to changes in temperature and concentration for a 3-hour chilling period. Gentle agitation does not change the shape of the curve appreciably. A longer chilling period results in more solid separating with a less sharp break in the curve but in a continuous process a chilling period longer than 3 hours is considered impracticable industrially." (Unpublished work at the Southern Regional Research Laboratory.)

In contrast to the hydrocarbons, polar solvents (oxygen-containing liquids which dissolve glyceridic mixtures without reaction) have been found to provide a medium in which well defined crystals (compared to those which form in the undiluted oils or in hydrocarbon solutions of glyceridic mixtures) are formed and are suitable for employment in the process of the present invention. In such polar solvents the crystals form more rapidly than any solid phase forms when the solvent is a hydrocarbon. With various purposes in mind the behaviour of numerous polar solvents for glyceridic mixtures have been studied. In general such compounds including ketones, aldehydes, esters, alcohols and the like classes of compounds have been found to provide mediums in which good crystals form but have, in some cases, been found to form two immiscible (the term being employed to refer to liquids which are not completely miscible) liquid phases before the desired amount of glyceride crystals form.

Acetone has been found to be a particularly suitable polar solvent for employment in the present process. In general, the lower aliphatic ketones, especially those containing not more than 5 carbon atoms such as methyl ethyl ketone, methyl propyl ketone and the like constitute preferred polar solvents.

The following operations are generally employed in succession in the production of winterized natural oils after they have been obtained in the form of hydrocarbon solutions from the oil materials: (1) refining (2) bleaching (3) winterizing and (4) deodorizing. Apparently satisfactory methods have been or can be worked out for performing all but the winterizing step upon a solvent-free natural oil or a solution of it in a hydrocarbon. Since, as has been pointed out above, even partially satisfactory solvent winterizations have heretofore required polar solvents, the process of the present invention provides the first commercially feasible method of producing a winterized oil obtained by hydrocarbon solvent extraction which does not necessitate twice subjecting the oils to a solvent stripping operation.

Since the hydrocarbon solutions commonly obtained by solvent extraction can be readily concentrated by conventional low temperature evaporations, a preferred method of conducting the process of this invention consists of concentrating the solution of oil and adding enough lower ketone to provide the desired ketone-hydrocarbon-oil ratio.

The fractionation of glycerides by the process of this invention can advantageously be applied to the crude natural oil thus removing some of the glycerides prior to refining and bleaching. However, it can also be accomplished following the refining, bleaching or deodorizing operations.

It is apparent that the steps of incorporating in the glyceride-hydrocarbon solution enough polar solvent to cause the glycerides of the fraction to be removed to solidify into well-defined solid phases without undesirable supercooling can be accomplished by a large number of alternative procedures. The hydrocarbon solution can be concentrated only slightly and polar solvent and oil added, the polar solvent and oil can be added without a concentration of the hydrocarbon solution, or any combination using polar solvent-hydrocarbon, polar solvent-oil, etc., mixtures can be employed.

For example, starting with a hydrocarbon-oil solution containing 15% of oil, a solvent-oil solution consisting of 35% of oil dissolved in a solvent consisting of 85 parts of polar solvent to 15 parts of hydrocarbon can be obtained by bringing the concentration of the original solution to 78% oil and adding 55 parts of a polar solvent (e. g., acetone) to 45 parts of the concentrated solution: or by bringing the concentration of the original solution to 63.8% oil, adding 63.8 parts of oil per 100 parts of this concentrate, and adding 55 parts of acetone to 45 parts of the resulting mixture or by bringing the concentration of the original solution to 54% oil, adding 108 parts of oil per 100 parts of concentrate, and adding 55 parts of acetone to 45 parts of the resulting mixture; etc.

The most suitable proportions of hydrocarbon to polar solvent in the solution sometimes vary with different specimens of the same oil. They depend upon the oil-solvent ratio to be used and upon the amount of solid it is desired to remove from the oil, and therefore, upon the chilling temperature to be used. When large percentages of solid are to be removed from the oil and lower chilling temperatures are used, the proportion of hydrocarbon solvent must sometimes be increased since some of the polar solvents when containing glyceridic mixtures tend to form two liquid phases when cooled until sufficient solids form.

As pointed out above, it is not necessary or desirable to evaporate the hydrocarbon until the hydrocarbon-oil solution contains less than about 10% hydrocarbon. It is shown in the article by Pollard, Vix and Gastrock in Ind. Eng. Chem. 37, 1022-7 (1945), that to evaporate off more hydrocarbon requires a longer exposure to higher temperatures. While the percentage of hydrocarbon in the hydrocarbon-oil solution can be further lowered, without impairing oil color or stability, by the addition of hydrocarbon-free oil, it is generally unnecessary to do so. Even in the case of the winterization of peanut oil in hexane diluted with acetone (a case in which the formation of two liquid phases in addition to the solid phases occurs at the chilling temperatures required when the solvent is undiluted acetone) in the case of the oils tested, a solvent mixture consisting of 15 parts by weight of hexane and 85 parts by weight of industrial C. P. acetone was found to give satisfactory results in this respect at all oil-solvent ratios up to 75 weight percent of oil.

The maximum proportion of hydrocarbon which can suitably be used depends upon a compromise between the advantages and the disadvantages involved in increasing this proportion. For example, for a given oil solvent ratio very much higher proportions of hydrocarbon can be used but correspondingly lower chilling temperatures will be required for the separation of the same amount of solids from the mixture. Since the starting materials contain relatively high concentrations of hydrocarbons, it is often desirable to determine this maximum by a simple test. Using tubes calibrated to indicate volume, by chilling a series of solutions of the glyceridic mixture to be fractionated in solvents varying in hydrocarbon to polar solvent ratios to the temperature at which it is desirable to operate, the maximum ratio of hydrocarbon which can be used while retaining the advantages of the formation of easily removable solids without undesirable supercooling can be readily determined by centrifuging the tubes and observing which ratios yield the desired amount of well-defined crystalline solid residue sufficiently rapidly.

In the case of the winterization of cottonseed oil, undiluted acetone can be used since the separation into two liquid layers in addition to the solid phase ordinarily takes place below the temperatures necessary to cause separation of sufficient solid to produce an adequately winterized oil. However, I have found that the presence of hydrocarbon in the acetone used as a solvent provides a distinct advantage in addition to the saving of a solvent stripping operation. Impurities such as moisture and other undetermined constituents in the oil, or in the acetone, cause the separation into two liquid phases in addition to the solid phases to take place at considerably higher temperatures, temperatures which are high enough to be within the range of the winterization process. When, however, the acetone is diluted by a hydrocarbon, even in the presence of moisture or the other impurities, no separation into two liquid layers occurs within the range of the winterization process.

Similarly, two liquid phases often form in the removal of glycerides which solidify at temperatures below those ordinarily used in winterization even though the acetone-oil solution is free of moisture and impurities. In many cases these same glycerides can be solidified in acetone diluted with hexane without the formation of two liquid phases.

The process of the invention can suitably be applied to any solvent extract of a natural glyceridic mixture, but solutions of glycerides in hydrocarbon such as the cyclic or open-chain pentanes, hexanes and octanes constitute a preferred class of starting materials for employment in the process of the invention. A commercial hexane solution is a particularly preferred starting material.

Cottonseed oil constitutes the preferred natural oil to be winterized by the process of the invention, particularly in the form of commercial hexane solutions. Such miscellas can suitably be employed in the crude, refined, refined and bleached, refined bleached and deodorized state: or can be employed in the form of oils which have been interesterified or otherwise processed in any of the above states.

The process of this invention can be operated in a batch-wise or continuous manner. The glyceride removal can be directed toward removing glycerides that would precipitate during storage in a refrigerator, toward altering the iodine value of the respective glyceridic mixtures or toward removing any glyceridic fraction for any purpose.

In order to illustrate in detail certain features of the invention the following examples are presented. However, as numerous modifications in compounds and operational steps are within its scope, the invention is not to be construed as being limited to the materials and methods recited in the examples.

In the examples the term "parts" refers to parts by weight and percent refers to the percent by weight.

The procedure followed in each of the examples was as follows:

Samples of approximately 200 ml. of the desired concentrations of oil in solvent were weighed into tared 250 ml. stoppered-glass centrifuge bottles. The samples were chilled at the desired temperature for a definite period (hereinafter referred to as holding-time) by immersion in a constant temperature bath regulated to with ±0.1° C. They were then quickly transferred to a refrigerated centrifuge and centrifuged at the same temperature for at least 10 minutes (usually for 30 minutes) at a speed corresponding to about 350 and 700 times gravity at the top and bottom of the solutions, respectively. The temperature of the centrifuge was so regulated that the liquid in the bottles during centrifugation was within 0.5° C. of the desired temperature. Unless so indicated, in no case were there two liquid phases present.

As much of the clear supernatant liquid as was possible without including any suspended solid particles was decanted into a tared flask. The centrifuge bottle with the residual solid and liquid (hereinafter referred to as the solid fraction) was weighed and the weights of the decanted supernatant liquid and of the solid fraction obtained by difference.

The amount and concentration of the oil in both the decanted supernatant liquid and the solid fraction were determined quantitatively by removing the solvent and heating to constant weight at 100° C. and 10 mm. pressure under a stream of nitrogen. Using these data calculations were made to determine the percentage of the oil which had separated as solid under the conditions of the experiment, based on the amount of oil originally present in each sample. This percentage value is hereinafter referred to as the "percent solid removed."

As a criterion of the degree of winterization, a modification of the American Oil Chemists' Society Official Method Cc 11-42 Cold Test was used which was suitable for testing the small samples encountered and which was shown by comparative tests to give essentially the same cold test values as the Official Method. The endpoint or point of failure was taken as the time at which a slight, almost indiscernible haze formed which was best detected by the loss of brilliance when compared with a clear control sample against a fluorescent light as a background. The term "cold test" as used in the example refers to the cold test value obtained in this manner upon the oil recovered from the supernatant liquid.

The samples employed in Examples 1 to 11 consisted of the indicated natural glyceridic mixtures obtained from the natural oil materials in the form of the various oils named by the conventional procedures indicated. They were then mixed with the solvents consisting of the various hydrocarbon-polar solvent mixtures.

EXAMPLES 1 TO 8

*Various oil-solvent ratios, hydrocarbon-polar solvent ratios, temperatures, holding-times, and glyceridic mixtures*

The oil used was a bleached cottonseed oil which had been separated from the source material and refined in the conventional manner. The polar solvent was a commercial C. P. acetone and the hydrocarbon was a commercial hexane, Skellysolve B.

The results of these experiments are summarized in the table below:

| Example No. | Solvent Composition in Parts by Weight | | Percent Oil in Solvent Solution | Chilling Temp., °C. | Holding-Time (Hours) | Percent Solid Removed | Cold Test (Hours) |
|---|---|---|---|---|---|---|---|
| | Polar Solvent | Hydrocarbon | | | | | |
| 1 | 85 | 15 | 20 | −12 | 3 | 4.8 | 3 |
| 2 | 85 | 15 | 40.5 | −12 | 3 | 10.5 | >97 |
| 3 | 85 | 15 | 60 | −12 | 3 | 12.9 | >97 |
| 4 | 85 | 15 | 75 | −12 | 3 | 14.5 | >97 |
| 5 | 85 | 15 | 20 | −10 | 3 | 0.9 | 1.5 |
| 6 | 85 | 15 | 40 | −10 | 3 | 8.3 | 24–39 |
| 7 | 85 | 15 | 60 | −10 | 3 | 11.6 | >162 |
| 8 | 85 | 15 | 75 | −10 | 3 | 13.2 | >162 |

EXAMPLE 9

*Raising the iodine value of a glyceridic mixture containing unsaturated glycerides*

A commercial crude cottonseed oil having an iodine value of 100.2 was dissolved to form a 35.2% solution in a mixture containing 85 parts by weight of commercial C. P. acetone and 15 parts of commercial hexane; Skellysolve B. It was subjected to a chilling temperature of −14° C. for a holding-time of 24 hours. The total solid removed was 16.9%. The oil recovered from the supernatant liquid and then refined had an iodine value of 110.2.

EXAMPLE 10

*Removing glyceride fractions from impure glyceride mixtures*

The oil used was a crude cottonseed oil extracted from the source material in the conventional manner. The cold tests were made after the oil had been refined in the conventional manner. The polar solvent was a commercial C. P. acetone and the hydrocarbon was a commercial hexane, Skellysolve B.

In the case of this example, the crude oil after winterization gave a cold test of 100 hours and after refining, the refined oil gave a cold test of 100 hours.

| Example No. | Solvent Composition in Parts by Weight | | Percent Oil in Solvent Solution | Chilling Temp., °C. | Holding-Time (Hours) | Percent Solid Removed | Cold Test (Hours) |
|---|---|---|---|---|---|---|---|
| | Polar Solvent | Hydrocarbon | | | | | |
| 10 | 85 | 15 | 35 | −14 | 24 | 17.6 | >100 |

EXAMPLE 11

*Effect of water*

A 40% solution of refined cottonseed oil in a mixture of 99 parts of C. P. acetone and 1 part of water was cooled to a temperature of 5° C. Two immiscible liquid phases were formed in addition to the solid phase and after a holding-time of 3 hours the total weight of solid separating was less than the 0.5% of the total weight of oil treated (equivalent to a cold test of less than ½ hour).

A 40% solution of the same cottonseed oil in a mixture of 85 parts of a C. P. acetone containing 1% of added water and 15 parts of commercial hexane was cooled to −8° C. In addition to the solid phase, only one liquid phase was present. After a 3-hour holding-time 5.1% of solid separated and the oil had a cold test of 7.5 hours.

EXAMPLE 12

*Incorporating polar solvents in typical hydrocarbon-glyceride solutions*

A typical extraction of cottonseed with commercial hexane in a batch pilot plant operation produced a crude cottonseed oil miscella having an oil concentration of 89.6% with an exposure of the oil in a conventional continuous evaporator to a maximum of only 70° C. for 7 hours. The iodine value of the crude oil recovered from an aliquot of the miscella was 100.9. Mixing 214.2 parts of the miscella with 126.6 parts of commercial C. P. acetone produced a solution containing 56.3% oil in a solvent consisting of 85 parts acetone and 15 parts hexane. This solution was subjected to a chilling temperature of −14° C. for a holding-time of 3 hours. The total solid removed was 18.2%. The iodine value of the crude oil recovered from the supernatant liquid was 112.1; representing an increase of 11.2 units. The calculated iodine value of the solids removed was 50.5.

A similar extraction of cottonseed produced a crude cottonseed oil miscella having an oil content of 42.5% but involved an exposure of the oil to a maximum of 70° C. for only 2 hours. The iodine value of the crude oil recovered from an aliquot of the miscella was 100.6. Mixing 115.2 parts of the miscella obtained above (containing 89.6% oil) with 37.1 parts of the miscella containing 42.5% oil and 187.7 parts of commercial C. P. acetone produced a solution containing 35% oil in a solvent consisting of 84.9 parts acetone and 15.1 parts of hexane. This solution was subjected to a chilling temperature of −14° C. for a holding-time of 3 hours. The amount of solid recovered was 16.3%. The iodine value of the crude oil recovered from the supernatant liquid was 110.4; representing an increase of about 9.8 units. The calculated iodine value of the solids removed was 51.5.

Having thus described my invention, I claim:

1. A process for the production of a winterized cottonseed oil, which comprises incorporating in a cottonseed oil-hexane-water solution enough acetone to provide an acetone-hexane ratio of about 85:15 in an acetone-hexane-water solution containing about 40% cottonseed oil, cooling to about −8° C. and removing the solids.

2. A process of fractionating cottonseed oil dissolved in hexane into a winterized oil having an iodine number greater than the iodine number of the cottonseed oil and a mixture of glycerides having a predetermined iodine number of less than the iodine number of the cottonseed oil which comprises: adjusting the proportion of hexane in the oil-hexane mixture and incorporating acetone into the mixture to form a mixture which at normal room temperature is a homogeneous solution containing from about 20 to 70 parts of oil per 100 parts of a solvent comprising acetone and hexane in a ratio of from 4 to 7 parts to 1 part, respectively; cooling the mixture so formed to a temperature below minus 10° C. but above the temperature at which two liquid phases form, centrifuging the cold mixture and isolating a solution fraction containing only dissolved glycerides having an iodine number greater than that of the original oil and a slurry fraction containing solidified glycerides and an amount of dissolved glycerides which, mixed with the solidified glycerides, forms a mixture of glycerides having an iodine number lower than that of the original oil.

3. A process of fractionating the cottonseed oil present in a mixture containing cottonseed oil, hexane, acetone, and water to obtain a winterized oil which comprises: adjusting the proportions of hexane and acetone in the aforementioned mixture containing cottonseed oil, hexane, acetone, and water to provide a homogeneous solution at normal room temperature containing, in addition to the water present, from about 20 to 70 parts of oil per 100 parts of acetone-hexane mixture, the acetone and hexane in said mixture being present in the ratio of from 4 to 7 parts of acetone to 1 part of hexane; cooling the solution to a temperature between about minus 10° C. and minus 14° C., said temperature range being above the temperature at which two liquid phases form, to form a single liquid phase and a suspended solid phase; centrifuging the cold suspension so formed; and isolating a supernatant solution fraction containing only dissolved glycerides comprising the winterized oil.

References Cited in the file of this patent

UNITED STATES PATENTS

| Number | Name | Date |
|---|---|---|
| 2,228,040 | Voogt et al. | Jan. 7, 1941 |
| 2,505,012 | Spannuth | Apr. 25, 1950 |